US009265085B2

(12) United States Patent
Wang et al.

(10) Patent No.: US 9,265,085 B2
(45) Date of Patent: Feb. 16, 2016

(54) METHODS AND SYSTEMS FOR OPTIMIZING SHORT DATA BURST SERVICES OVER AN LTE NETWORK

(71) Applicant: Alcatel-Lucent USA, Inc, Murray Hill, NJ (US)

(72) Inventors: Jin Wang, Lisle (IL); Yang Yang, Morris Plains, NJ (US); Jialin Zou, Murray Hill, NJ (US)

(73) Assignee: Alcatel Lucent, Boulogne, Billancourt (FR)

( * ) Notice: Subject to any disclaimer, the term of this patent is extended or adjusted under 35 U.S.C. 154(b) by 209 days.

(21) Appl. No.: 14/145,244

(22) Filed: Dec. 31, 2013

(65) Prior Publication Data
US 2015/0189689 A1    Jul. 2, 2015

(51) Int. Cl.
*H04W 76/04* (2009.01)
*H04L 5/00* (2006.01)
*H04W 4/00* (2009.01)
*H04W 4/14* (2009.01)
*H04W 76/02* (2009.01)

(52) U.S. Cl.
CPC .......... *H04W 76/046* (2013.01); *H04L 5/0055* (2013.01); *H04W 4/005* (2013.01); *H04W 4/14* (2013.01); *H04W 76/02* (2013.01)

(58) Field of Classification Search
CPC ..... H04W 76/046; H04W 4/005; H04W 4/14; H04W 76/02; H04L 5/0055
See application file for complete search history.

(56) References Cited

U.S. PATENT DOCUMENTS

| 2010/0087212 | A1 | 4/2010 | Shi et al. | |
|---|---|---|---|---|
| 2013/0095796 | A1* | 4/2013 | Cho | H04W 4/14 455/411 |
| 2014/0140305 | A1* | 5/2014 | Barrett | H04W 4/005 370/329 |

FOREIGN PATENT DOCUMENTS

| EP | 2 498 566 A2 | 9/2012 |
|---|---|---|
| EP | 2 509 345 A1 | 10/2012 |
| EP | 2 568 728 A2 | 3/2013 |
| WO | WO2013017839 | 2/2013 |
| WO | WO2013017840 | 2/2013 |

* cited by examiner

*Primary Examiner* — Melvin Marcelo
(74) *Attorney, Agent, or Firm* — Capitol Patent & Trademark Law Firm, PLLC

(57) ABSTRACT

Methods and related systems for managing wireless network capacity in support of short data burst (SDB) services over long term evolution (LTE)-based networks are provided. Such methods and systems provide improved efficiency and performance, thereby increasing the capacity of LTE-based networks to support SDB services.

20 Claims, 5 Drawing Sheets

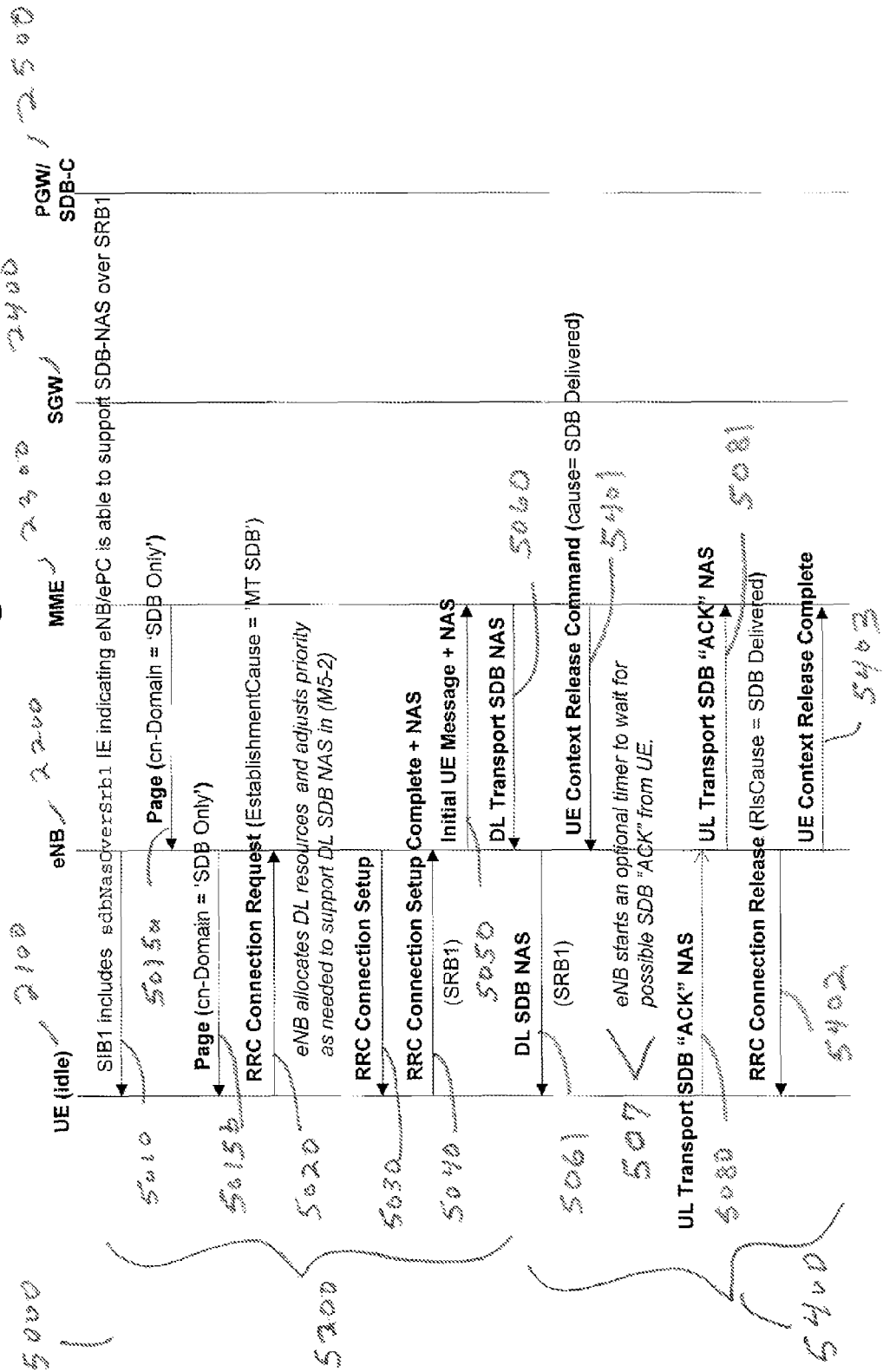

METHODS AND SYSTEMS FOR OPTIMIZING SHORT DATA BURST SERVICES OVER AN LTE NETWORK

BACKGROUND

In order to send and receive short data burst (SDB) communications using existing long term evolution (LTE)-based networks ("LTE network" for short) typically requires the initial establishment (referred to as "set up"), configuration, and release of a complete radio resource connection ("RRC connection"). While the set up, configuration and release process may be efficient when large amounts of data need to be exchanged between end user devices and an LTE network, it is highly inefficient when relatively small amounts of data need to be exchanged, which is commonly the case for applications and services that utilize SDB communications (collectively referred to as "SDB services" or "SDB communications").

To avoid the requirement to set up, configure and release a complete RRC connection for SDB services some LTE network providers have adopted the practice of simply maintaining (i.e., not releasing) RRC connections. However, this practice still requires the provider to dedicate precious bandwidth and processing, among other network resources, to maintain such connections. Worse yet, many times such RRC connections become idle (i.e., unused).

SUMMARY

In accordance with the various embodiments of the invention methods and systems are provided that make efficient use of LTE network resources while supporting SDB services. Further, it is believed that the methods and systems described herein may allow such resources to be used in a highly efficient manner such that the capacity of an LTE network may be maximized.

In one embodiment, a method for managing the capacity of an LTE network to support SDB services may comprise: receiving a RRC connection request message comprising a mobile originated (MO), SDB indicator, at an evolved node (eNB) from user equipment (UE) over a signaling radio bearer channel; transmitting an RRC connection set-up message from the eNB to the UE in response to the RRC connection request message; receiving an RRC connection set-up complete message comprising an uplink, non-access stratum (NAS) message that further comprises MO SDB content and the MO SDB indicator at the eNB from the UE; forwarding the NAS message with the MO SDB content and indicator and an initial UE message from the eNB to a mobility management entity (MME); receiving an initial context set-up request message containing an MO SDB indicator flag at the eNB from the MME; sending a RRC connection release message from the eNB to the UE; and sending a UE context release request message comprising an SDB delivery indicator from the eNB to the MME. This exemplary method may further comprise one or more additional processes, such as: (i) sending the initial context set-up request message containing the MO SB indicator flag from the MME to the eNB; (ii) receiving a UE context release command message at the eNB from the MME; and sending a UE context release complete message from the eNB to the MME; (iii) transmitting a message that comprises a capability indicator from the eNB, the capability indicator indicating the eNB is capable of SDB capacity optimization; (iv) receiving a transmitted message comprising a capability indicator at the UE, the capability indicator indicating the eNB is capable of SDB capacity optimization; (v) transmitting the RRC connection request message from the UE to the eNB using the signaling radio bearer channel; receiving the RRC connection set-up message at the UE from the eNB; and transmitting the RRC connection set-up complete message comprising the uplink, NAS message that further comprises the MO SDB content and the MO SDB indicator from the UE to the eNB; (vi) transmitting a RRC connection request message from the UE to the eNB that does not include the MO SDB indicator based on a determination that an amount of data to be transmitted by the UE to the eNB in an uplink, NAS message exceeds a threshold; and completing call admission control messages to set up an RRC connection; (vii) receiving a downlink, acknowledgment NAS message at the eNB; and forwarding the downlink, acknowledgement NAS message from the eNB to the UE prior to sending the RRC connection release message to the UE based on a determination that the downlink, acknowledgement NAS message is received from the MME within a configurable time period, where the configurable time period may comprise a range of periods from 1 second to 3 seconds.

In another embodiment of the invention a method for managing the capacity of a LTE network to support SDB services may comprise: receiving a RRC connection request message at an eNB from UE over a signaling radio bearer channel; transmitting an RRC connection set-up message from the eNB to the UE; receiving an RRC connection set-up complete message comprising an NAS message that further comprises SDB content at the eNB from the UE; forwarding the NAS message with the SDB content from the eNB to a MME; and receiving a UE context release command message containing an SDB delivery indicator from the MME at the eNB. This method may further comprise one or more additional processes, such as: (i) sending a RRC connection release message to the UE from the eNB; and sending a UE context release complete message from the eNB to the MME; (ii) transmitting the RRC connection request message from the UE to the eNB using the signaling radio bearer channel; receiving the RRC connection set-up message at the UE from the eNB; and transmitting the RRC connection setup complete message comprising the uplink, NAS message that further comprises the SDB content from the UE to the eNB; (iii) receiving a downlink, acknowledgement NAS message at the eNB; and forwarding the downlink, acknowledgement NAS message from the eNB to the UE prior to sending the RRC connection release message to the UE based on a determination that the downlink, acknowledgement NAS message is received from the MME within a configurable time period, where, as before the configurable time period may comprise a range of periods from 1 second to 3 seconds; (iv) determining at the MME that an estimated amount of data to be transmitted from the UE to the eNB in an uplink, NAS message does not exceed a threshold; and transmitting the UE context release command message comprising the SDB delivery indicator from the MME to the eNB; (v) accessing a database that includes a profile and a summary of measurements of an amount of data previously transferred from the UE to the eNB; and determining that the estimated amount of data to be transmitted from the UE to the eNB in the uplink, NAS message does not exceed a threshold, and wherein the UE may substantially always transmit data below the threshold.

In yet another embodiment a method for managing the capacity of a LTE network to support SDB services may comprise: receiving a paging message at an eNB that includes a SDB type indicator from a MME; transmitting an eNB paging message that includes the SDB type indicator from the eNB to UE within an eNB paging area, and within a tracking area of the MME; receiving a RRC connection request message from the UE over a signaling radio bearer channel; transmitting a RRC connection setup message from the eNB to the UE; receiving an RRC connection setup complete message from the UE; sending an initial UE message to the MME; receiving a downlink, NAS message containing SDB content from the MME; forwarding the downlink, NAS message to the UE; receiving a UE context release command message from the MME; sending a RRC connection release message to the UE; and sending a UE context release complete message to the MME. The method may further comprise one or more additional processes such as: (i) receiving an uplink acknowledgement (ACK), NAS message at the eNB from the UE; forwarding the uplink, ACK NAS message to the MME prior to sending the RRC connection release message to the UE based on a determination that the uplink, ACK NAS message is received from the UE within a configurable time period, where the configurable time period may comprise a range of time periods from 1 second to 3 seconds.

In still another embodiment a method for managing the capacity of an LTE network to support SDB services may comprise: accessing a database that includes profiles of UE capable of receiving SDB type data in order to set a threshold; determining whether an amount of pending data is below the threshold at the MME; and sending the pending data as SDB type data from an eNB to a particular UE without using an SDB indicator based on a determination that the amount of pending data is below the threshold, where the threshold may be associated with an amount of data sent to the profiled UE. This method may additionally comprise sending a UE context release command message from the MME to the eNB without first sending an initial context set up request message to the eNB.

In addition to the methods set forth above the present invention also provides for systems for completing such processes. In one embodiment a system for managing the capacity of a LTE network to support SDB services comprises an eNB operable to, for example, receive a RRC connection request message comprising a MO, SDB indicator from UE over a signaling radio bearer channel; transmit an RRC connection set-up message to the UE; receive an RRC connection set-up complete message comprising a NAS message that further comprises MO SDB content and the MO SDB indicator from the UE; forward the NAS message with the MO SDB content and indicator and an initial UE message to a MME; receive an initial context set-up request message containing an MO SDB indicator flag from the MME; send a RRC connection release message to the UE; and send a UE context release request message comprising an SDB delivery indicator to the MME.

Such a system may additionally comprise an MME operable to send the initial context set-up request message containing the MO SDB indicator flag to the eNB, and a UE operable to: (i) receive a transmitted message comprising a capability indicator from the eNB, the capability indicator indicating the eNB is capable of SDB capacity optimization; (ii) transmit the RRC connection request message to the eNB using the signaling radio bearer channel; receive the RRC connection set-up message from the eNB; and transmit the RRC connection set-up complete message comprising the uplink, NAS message that further comprises the MO SDB content and the MO SDB indicator to the eNB; (iii) transmit the RRC connection request message to the eNB that does not include the MO SDB indicator based on a determination that an amount of data to be transmitted by the UE to the eNB in an uplink, NAS message exceeds a threshold, wherein the eNB is further operable to complete call admission control messages to set up an RRC connection.

An inventive eNB may further be operable to: (i) receive a UE context release command message from the MME; and send a UE context release complete message to the MME; (ii) transmit a message comprising a capability indicator, the capability indicator indicating the eNB is capable of SDB capacity optimization; (iii) receive a downlink acknowledgment NAS message; and forward the downlink, acknowledgement NAS message to the UE prior to sending the RRC connection release message to the UE based on a determination that the downlink, ACK, NAS message is received from the MME within a configurable time period, where the configurable time period comprises a range of periods from 1 second to 3 seconds.

In another embodiment a system for managing the capacity of a LTE network to support SDB services may comprise an eNB operable to receive a RRC connection request message from UE over a signaling radio bearer channel; transmit an RRC connection set-up message to the UE; receive an RRC connection set-up complete message comprising an uplink, NAS message that further comprises SDB content from the UE; forward the NAS message with the SDB content to a MME; and receive a UE context release command message containing an SDB delivery indicator from the MME. The eNB may additionally be operable to: (i) send a RRC connection release message to the UE; and send a UE context release complete message to the MME; (ii) receive a downlink, acknowledgement NAS message; and forward the downlink, acknowledgement NAS message to the UE prior to sending the RRC connection release message to the UE based on a determination that the downlink, acknowledgement NAS message is received from the MME within a configurable time period, where the configurable time period comprises a range of periods from 1 second to 3 seconds.

The system may further comprise a UE operable to transmit the RRC connection request message to the eNB using the signaling radio bearer channel; receive the RRC connection set-up message from the eNB; and transmit the RRC connection setup complete message comprising the uplink, NAS message that further comprises the SDB content to the eNB, wherein the UE may be operable to substantially, always transmit data below the threshold.

Yet further the system may comprise an MME operable to determine that an estimated amount of data to be transmitted from the UE to the eNB in an uplink, NAS message does not exceed a threshold; and transmit the UE context release command message comprising the SDB delivery indicator to the eNB. The MME may be further operable to: access a database that includes a profile and a summary of measurements of amounts of data previously transferred from the UE to the eNB; and determine that the estimated amount of data to be transmitted from the UE to the eNB in the uplink, NAS message does not exceed a threshold.

In yet another embodiment a system for managing the capacity of a LTE network to support SDB services may comprise an eNB node operable to receive a paging message that includes a SDB type indicator from a MME; transmit an eNB paging message that includes the SDB type indicator to UE within an eNB paging area, and within a tracking area of the MME; receive a RRC connection request message from the UE over a signaling radio bearer channel; transmit a RRC connection setup message to the UE; receive an RRC connection setup complete message from the UE; send an initial UE message to the MME; receive a downlink, NAS message containing SDB content from the MME; forward the downlink, NAS message to the UE; receive a UE context release command message from the MME; send a RRC connection release message to the UE; and send a UE context release complete message to the MME. The eNB may be further operable to: receive an uplink ACK, NAS message from the UE; forward the uplink, ACK NAS message to the MME prior to sending the RRC connection release message to the UE based on a determination that the uplink, ACK NAS message is received from the UE within a configurable time period, where the configurable time period may comprise a range of time periods from 1 second to 3 seconds.

In still another embodiment a system for managing the capacity of a LTE network to support SDB services may comprise a MME operable to: access a database that includes profiles of UE capable of receiving SDB type data in order to set a threshold; and determine whether an amount of pending data is below the threshold; and an eNB operable to send the pending data as SDB type data to a particular UE without using an SDB indicator based on a determination that the amount of pending data is below the threshold, where the threshold is associated with an amount of data sent to the profiled UE. The MME may be further operable to send a UE context release command message to the eNB without first sending an initial context set up request message to the eNB.

Additional embodiments and features of various embodiments of the described invention will be apparent from the following detailed description and appended drawings.

BRIEF DESCRIPTION OF THE DRAWINGS

FIG. 5 depicts a diagram of a messaging structure in accordance with yet another embodiment of the invention.

DETAILED DESCRIPTION, WITH EXAMPLES

Figure 1:
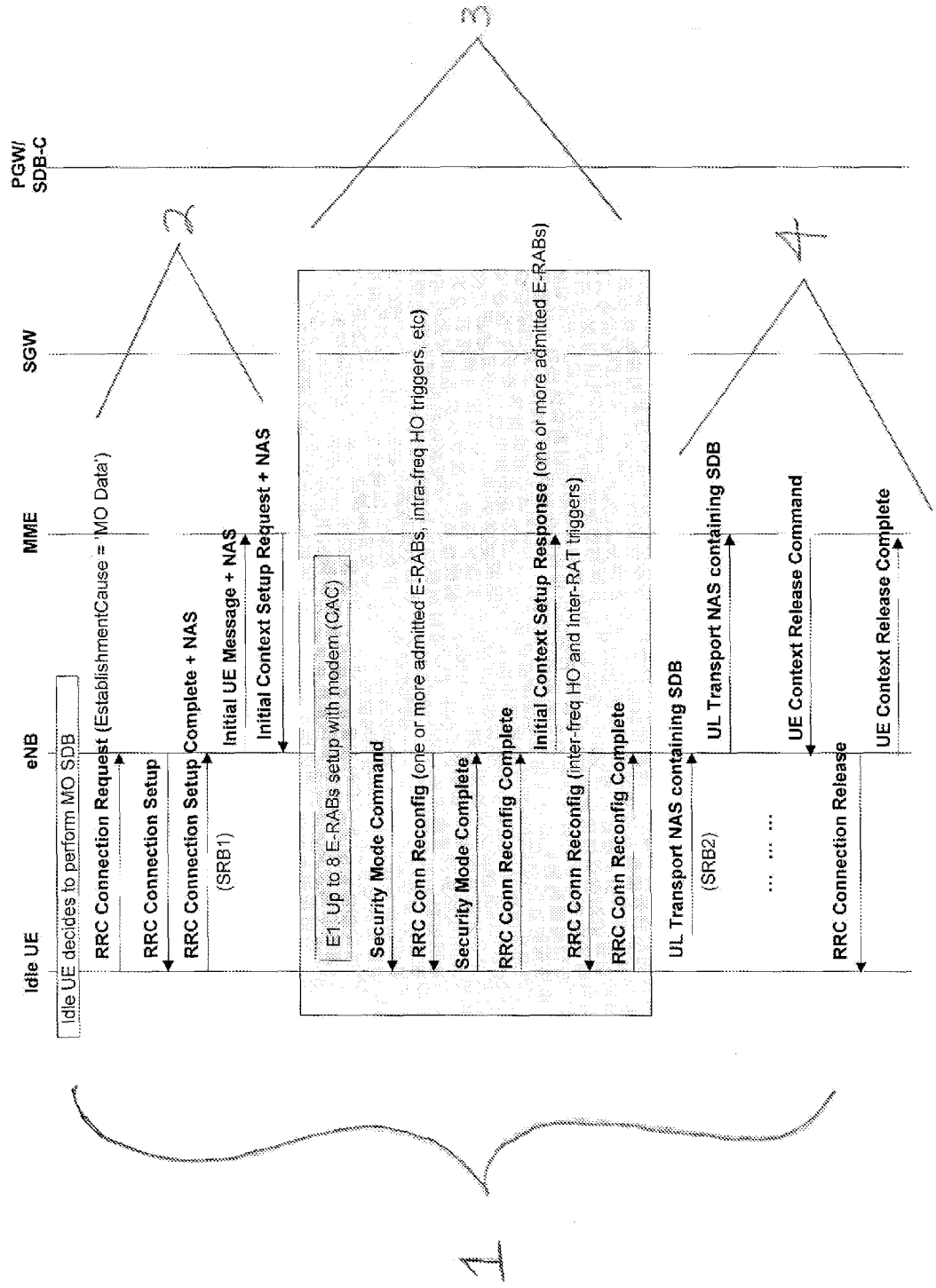
FIG. 1 depicts a diagram of a messaging structure in accordance with a traditional RRC set up, configuration and release process used by LTE networks.

Exemplary embodiments of methods and systems for providing SDB services within an LTE network are described herein in detail and shown by way of example in the drawings. Throughout the following description and drawings, like reference numbers/characters refer to like elements.

It should be understood that, although specific exemplary embodiments are discussed herein there is no intent to limit the scope of the invention to such embodiments. To the contrary, it should be understood that the exemplary embodiments discussed herein are for illustrative purposes, and that modified and alternative embodiments may be implemented without departing from the scope of the invention.

Similarly, specific structural and functional details disclosed herein are merely representative for purposes of describing the exemplary embodiments. The invention described herein, however, may be embodied in many alternate forms and should not be construed as limited to only the embodiments set forth herein.

It should be noted that some exemplary embodiments may be described as processes or methods depicted as a messaging structure(s). Although a messaging structure may depict messages as sequential, many of the messages may be performed in parallel, concurrently or simultaneously. In addition, the order of each message may be re-arranged. Further, a messaging structure may be terminated when completed, and/or may also include additional messages not included in the messaging structure.

As used herein, the term "and/or" includes any and all combinations of one or more of the associated listed items. It should be understood that when an element of a network is described as communicating with another element or depicted as communicating with, or being connected to, another element it may be in direct communication with, or directly connected to, the other element; or may be indirectly communicating with, and/or indirectly connected to, the other element (i.e., intervening elements may be present) unless otherwise specified. Other words used to describe communicative, connective or spatial relationships between elements or components should be interpreted in a like fashion. Unless specifically stated otherwise, or as is apparent from the discussion, it should be understood that each element of an LTE network (e.g., UE, eNB, MME, gateway, etc.) includes at least one or more computing devices, such as a hardware controller or server, processor(s) or similar electronic computing device, that may be operable to access and execute instructions stored in the computing device's associated registers, memories, other information storage and computer readable mediums (collectively "memory" for short), for example, in order to implement and/or complete the features, functions, messages, methods and processes of the invention (e.g., the transmission, reception and/or exchange of messages between elements of an LTE network). Further such computing devices may be operable to access, manipulate and transform data represented as physical, electronic quantities within memory (e.g., content, content indicators) into other data similarly represented as physical quantities within memory. Unless specifically stated otherwise, or as is apparent from the discussion, the phrase "operable to" means at least one of: being configured to complete, having the capability of operating to complete, and is operating to complete, specified features, functions, process steps, for example transmitting, receiving and/or exchanging messages in an LTE network. It should be understood that when the terms "receive", "transmit", "send", "forward", "determine", "detect", "allocate", "bundle", "embed", "instruct", "access", "prepare" as well as other action or functional terms and their various tenses are used herein that such actions or functions may be implemented or completed by one or more of the computing devices within an LTE element described herein.

As used herein, the term "embodiment" refers to an exemplary embodiment or example of the invention.

Referring to FIG. 1, there is shown a diagram of a messaging structure 1 that comprises message flows in accordance with a traditional radio resource connection (RRC) set up, configuration and release process used by Long Term Evolution (LTE) networks.

For the sake of clarity, the messaging structure 1 may be grouped into three groups: a set up and messaging group 2 ("set up group"), a configuration group 3, and a messaging and release group 4 ("release group"). Typically, in order to exchange short data burst (SDB) communications between elements of an LTE network, message flows similar to those depicted in FIG. 1 must be transmitted and received by such elements. Typical elements of an LTE network comprise UEs (e.g., wireless telephones, smartphones, tablets, laptops, wireless routers, wireless metering and monitoring devices, robots), eNBs (e.g., mobile base station equipment), an mobility management entity (MME), a serving gateway (SGW), and a packet data network gateway (PGW), it being understood that additional devices may be included between each of these devices. For the sake of clarity, because the role of these additional devices is not necessary for an understanding of the message flows in FIG. 1 they have been omitted.

Continuing, it should be understood that the message flows depicted in FIG. 1 necessarily require the elements of an LTE network to dedicate their processing capabilities in order to complete each of the individual message flows (or "message(s)" for short). Further, each message consumes valuable bandwidth between elements. Notably, the messages depicted in FIG. 1 are typically required without regard to the amount of data exchanged, or to be exchanged, between elements. Said another way, the messages in FIG. 1 are completed when small or large amounts of data are sought to be exchanged between elements of the LTE network. When a large amount of data is exchanged such messages may be an efficient process to complete an RRC connection. However, when a small amount of data is intended to be exchanged, as is many times the case with SDB communications, the messages depicted in FIG. 1 are an inefficient process of exchanging such communications.

Accordingly, to make more efficient use of the resources available within an LTE network, methods and related systems set forth in embodiments of the invention substantially modify the message structure depicted in FIG. 1 to support SDB services (i.e., to complete SDB communications). In one embodiment of the invention, the messages making up the configuration group 3 (referred to also as call admission control (CAC) messages) may be omitted while the messages making up the set up and release groups 2, 4 may be modified, for example.

Figure 2:
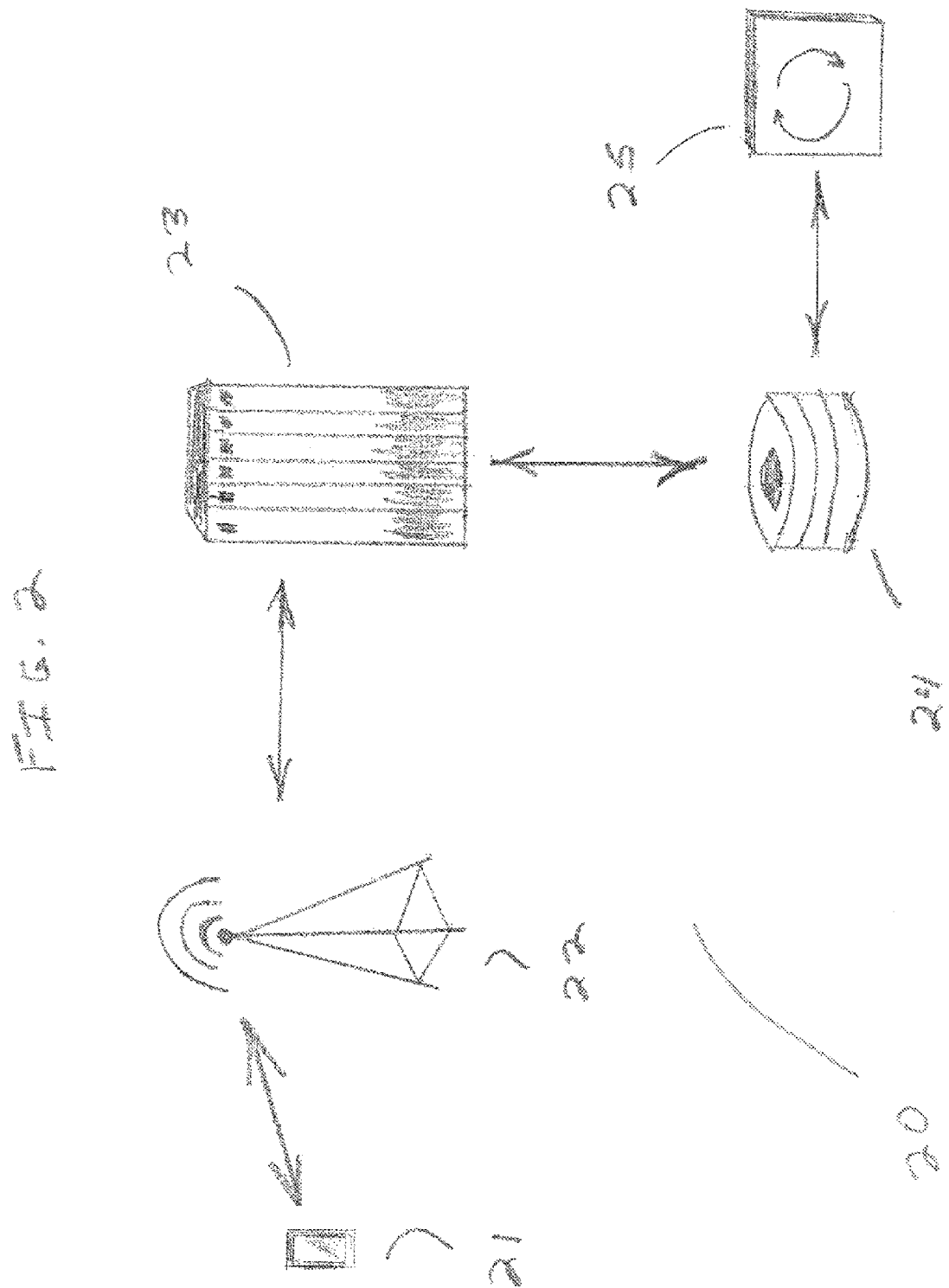
FIG. 2 depicts a simplified block diagram of a system according to an embodiment of the invention.

Before presenting exemplary messaging structures in accordance with the invention that may be used to make more efficient use of the resources available within an LTE network to support SDB services, a system according to an embodiment of the present invention is first presented. Referring now to FIG. 2 there is depicted a simplified block diagram of such a system 20. In accordance with an exemplary embodiment the system 20 may comprise a UE 21, eNB 22, MME 23, SGW 24 and PGW 25, for example. Each of the elements of the system 20 may be part of an LTE network and may include a computing device that may be configured to transmit, receive and/or exchange messages and data in accordance with the inventive messaging structures described herein. More particularly, the system 20 may be operable to exchange SDB communications, such as those that constitute a Short Message Service (SMS) over LTE, Instant Messaging (IM) over LTE, meter reading and reporting over LTE, and/or machine-to-machine communications over LTE, to name just some of the many types of SDB services.

Figure 3:
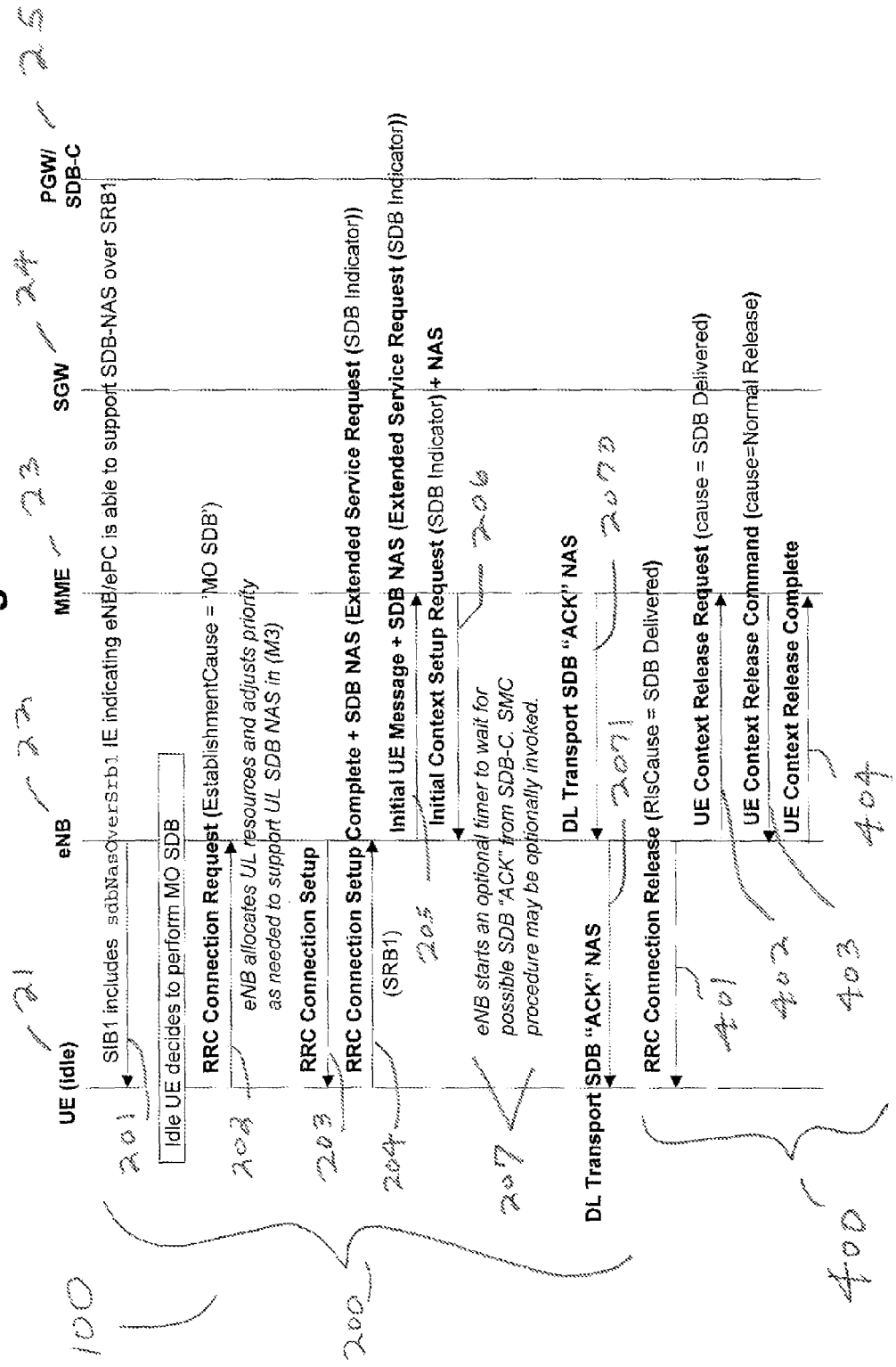
FIG. 3 depicts a diagram of a messaging structure in accordance with an embodiment of the invention.

Referring now to FIG. 3 there is depicted a diagram of a messaging structure 100 in accordance with an embodiment of the present invention. As depicted, the messaging structure 100 need not make use of CAC messages, such as the messages making up configuration group 3 shown in FIG. 1. Further, in accordance with one or more embodiments of the invention, the messages within the set up group 200 and release group 400 in FIG. 3 may comprise messages that may be substantially modified from the messages within groups 2, 4 in FIG. 1, and/or new messages may be added to groups 200, 400, for example.

To place the messaging structure 100 in context with the system 20 depicted in FIG. 2, in an embodiment of the invention the UE 21 may desire to originate and exchange SDB communications (e.g., SMS messages) with elements within an LTE network.

In accordance with one or more embodiments of the invention the messaging structure 100 may comprise a method or process (collectively "method") for managing the capacity of an LTE network to support SDB services. The elements of the system 20 in FIG. 2, such as the UE 21, eNB 22 and/or MME 23 may be operable to implement and/or complete such a method.

For example, in one embodiment of the invention, the eNB 22 may be operable to transmit (e.g., broadcast) a message 201 that comprises a "capability" indicator to one or more UEs, including UE 21, the capability indicator indicating that the eNB 22 is capable of SDB capacity optimization in accordance with the invention. Said another way, the capability indicator may indicate that the eNB 22 is capable of implementing and/or completing parts of the messaging structure 100 (e.g., transmitting, sending, forwarding and/or receiving messages) depicted in FIG. 3 (as well as others described herein, for example). Relatedly, the UE 21 may be operable to receive the transmitted capability indicator from the eNB 22. In this manner, the UE 21 may detect or otherwise determine that the eNB 22 is capable of SDB capacity optimization as well. It should be understood that the use of a transmitted capability indicator is just one of many methods by which one element of an LTE network may communicate, to other elements of such a network, that the one element is capable of SDB capacity optimization in accordance with the invention. Other methods will be discussed elsewhere herein. Further, variations of the methods set forth herein are considered to be within the scope of the invention.

Accordingly, in some way the UE 21 determines that the eNB 22 and other elements of the LTE network are operable to implement and/or complete the messaging structure 100. Thereafter, in one embodiment of the invention, the UE 21 may be operable to wirelessly (for example) transmit an RRC connection request message 202 comprising a mobile originated (MO), SDB indicator from the UE 21 to the eNB 22 using (i.e., transmitted via) a high priority, signaling radio bearer channel, such as a signaling radio bearer 1 ("SRB1") channel. It should be noted that to the inventors knowledge the MO, SDB indicator, and its use within an RRC connection request message, is unique. In more detail, in the traditional RRC connection messaging structure an RRC connection request typically includes a section referred to as the "Establishment Cause". In accordance with an embodiment of the invention, the MO, SDB indicator may be a unique value that may be uniquely inserted into an Establishment Cause section by the UE 21, for example. In a further embodiment the MO, SDB indicator may comprise an SMS sub-indicator, for example. The MO, SDB indicator indicates that the UE 21 intends to transmit or otherwise send SDB type data to an LTE network, in this case the LTE network that contains the eNB 22 and MME 23. By so indicating that it intends to send SDB type data to the LTE network, the UE 21 allows elements of the LTE network, such as eNB 22 and MME 23, time to prepare to optimize their operation(s) in preparation to receive subsequent SDB type data (e.g., content).

Upon wirelessly (for example) receiving the RRC connection request message 202 comprising the MO, SDB indicator from the UE 21 over the SRB1 channel, the eNB 22 may be operable to wirelessly transmit an RRC connection set-up message 203 to the UE 21 in response to the RRC connection request message 202. Still further, the eNB 22 may be operable to allocate lower-layer resources in the uplink (i.e., UE 21-to-eNB 22) direction tailored for the transport of a subsequent message containing SDB type data (e.g., content) from the UE 21.

In turn, upon receiving the RRC connection set-up message 203 from the eNB 22, the UE 21 may be operable to wirelessly (for example) transmit an RRC connection set-up complete message 204 comprising an embedded and concatenated uplink, NAS message that comprises MO, SDB content and a MO, SDB indicator to the eNB 22, for example. In one embodiment of the invention, to complete the set up of an RRC connection of all signaling radio bearers, upon receiving the RRC connection set-up complete message 204 that comprises the uplink, NAS message with the MO, SDB content and indicator from the UE 21, the eNB 21 may be operable to bundle and forward the NAS message with the MO, SDB indicator to the MME 23 as a message 205 without analyzing the NAS content or indicator. That is, the eNB 22 may not open a payload within the message 204 that contains the MO, SDB content and indicator. Instead, the eNB 22 may be operable to forward the message 204 and its payload on to the MME 23 along with an initial UE message as message 205. Upon receiving the message 205, the MME 23 may be operable to open the payload containing the MO, SDB content and indicator in addition to the initial UE message. At this point in the structure, the MME 23 may be operable to read the MO, SDB content and indicator, and determine from the MO, SDB indicator that the UE 21 intends to send SDB type data (content) due to the presence of the MO, SDB indicator within the opened payload. Accordingly, to inform the eNB 22 of the UE 21's intentions, the MME 23 may be operable to send an initial context set-up request message 206 containing a copy of the MO SDB indicator as a MO, SDB indicator "flag" (e.g., an attribute value) within the message 206 to the eNB 22.

The eNB 22 may be operable to receive the message 206 including the MO, SDB indicator flag. In accordance with one embodiment of the invention, the eNB 22 may be further operable to read the flag, and determine that the flag indicates that the UE 21 intends to send SDB type data (content) to the LTE network, including the eNB 22.

In accordance with one embodiment of the invention, because the eNB 22 is now aware that the UE 21 intends to send SDB type data there is no longer a need to complete CAC messages, such as those within group 3 in FIG. 1. Because such CAC messages are not needed, the eNB 22 does not need to devote precious processing resources, or allocate traffic radio bearer (TRB) resources to the UE 21 as a result of such CAC messages. TRB resources may also be commonly referred to as data radio bearer (DRB) resources or evolved universal terrestrial radio access network bearer (E-RAB) resources. Further, the eNB 22 need not commit bandwidth to the reception and transmission of traffic bearers. Further, the eNB 22 may now release SRB resources (see message 401, discussed below, for example) and stop associated processing so that these shared resources may be re-allocated to other functions or other UEs, including those that may be involved in supporting SDB services. In sum, the net effect is to make an LTE network more efficient in handling SDB services while not adversely affecting such services, as well as other services.

As indicated above, the eNB 22 may release SRB resources and the established RRC connection. In accordance with an embodiment of the invention, the eNB 22 may immediately send an RRC connection release message 401 to the UE 21. However, in an alternative embodiment, instead of immediately initiating a process to release the established RRC connection (i.e., sending message 401 to the UE 21) upon reception of message 206, the eNB 22 may be operable to start, or initiate the start of, (collectively "start") an optional timer (process 207 in FIG. 3). In this manner, if the eNB 22 (for example) determines that a downlink, ACK NAS message may be received at the eNB 22 (from the MME 23 or the PGW/SMS-C 25, for example) (or, in fact, one is received) after the timer is started, but before a configurable time period has expired (i.e., within the configurable time period), then the eNB 22 may be further operable to forward the downlink, ACK NAS message to the UE 21 prior to initiating an RRC connection release process (e.g., prior to sending the RRC connection release message 401 to the UE 21). In embodiments of the invention the configurable time period may comprise a range of time periods from 1 second to 3 seconds, for example.

In either case, that is if an optional timer and time period are not used, or, if used, once such a time period expires (or an ACK NAS message has been sent), the eNB 22 may be operable to send an RRC connection release message 401 to the UE 21 in order to initiate the process of releasing the established RRC connection and associated resources. Further, in either case no CAC messages need to be transmitted or received.

To indicate that SDB type message processing with respect to the UE 21 has been completed and the established RRC has been released, the eNB 22 may be operable to send a UE context release request message 402 including an SDB delivery indicator to the MME 23. In accordance with an embodiment of the invention, the eNB 22 may send such a message without responding to the initial context set-up request message 206 containing the SDB indicator. As recognized by those skilled in the art, traditional LTE communications and the standards governing such communications (and in particular the standards governing the eNB-MME interface) require that an explicit reply message be sent in response to an initial context set-up request message. For example, an initial context setup response message or an initial context setup failure message (i.e., CAC messages) may be sent from an eNB to an MME. Such a responsive message typically indicates the status of the TRB setup requests requested by a message, such as message 206. In accordance with one embodiment of the invention, such responsive messages need not be sent. Instead, the UE context release request message 402 comprising the SDB delivery indicator may be sent to the MME 23.

To complete the RRC connection release process, several "housekeeping" messages may be exchanged between the eNB 22 and MME 23. For example, the eNB 22 may be operable to receive a UE context release command message 403 from the MME 23, and thereafter, may be operable to send a UE context release complete message 404 to the MME 23.

In one or more embodiments of the invention described above, it has been assumed that the amount of data (e.g., content) to be transmitted from a UE to an LTE network (or vice-versa) within a message is relatively small. However, at some instant of time this may not be the case. Accordingly, notwithstanding the ability of the UE 21 and other elements of the LTE network (e.g., eNB 22, MME 23) to implement and complete the inventive processes described above, in one alternative embodiment of the invention, if the UE 21 (for example) determines that an amount of data to be transmitted by the UE 21 to the eNB 22 in an uplink, NAS message may exceed a threshold, then the UE 21 may be operable to wirelessly (for example) transmit an RRC connection request message to the eNB 22 that does not include (i.e., without including) an MO SDB indicator. Upon determining that an MO SDB indicator (i.e., an attribute value) described herein is not present either within a RRC connection request message 202 or a MME message 206, the eNB 22 may be operable to include and complete CAC messages, such as those making up the configuration group 3 in FIG. 1, to set up an RRC connection.

In one or more embodiments of the invention illustrated in FIG. 3, the UE 21 may be one that is being actively operated by a user or may be one that operates without any user involvement. In the latter case, the communications between the UE 21 and the rest of the LTE network may be referred to as "machine-to-machine" communications.

Additional embodiments are aimed at making even more efficient use of the resources available within an LTE network when it is determined that a UE may substantially, always exchange machine-to-machine communications with an LTE network. In one embodiment of the invention, an MME may be operable to access its own or an associated database in order to determine if a particular UE may be substantially, always exchanging machine-to-machine communications with an LTE network. Upon determining that an UE is so operating, the MME may be operable to generate and forward a UE context release command to an eNB (e.g., message 4030 in FIG. 4) without sending an initial context setup request message (e.g., message 206 in FIG. 3), thus further reducing the amount of processing needed by elements of an LTE network.

Figure 4:
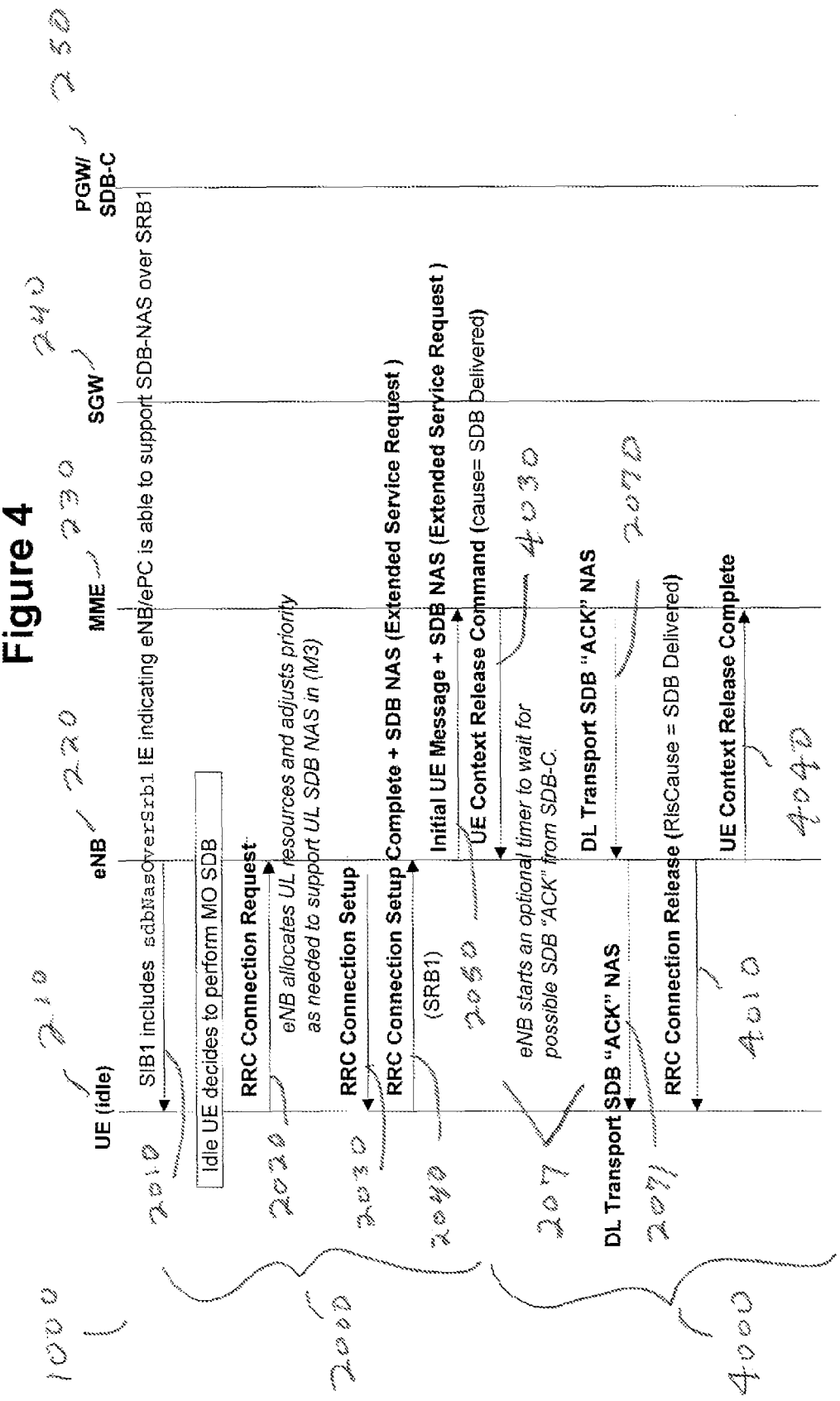
FIG. 4 depicts a diagram of a messaging structure in accordance with another embodiment of the invention.

In more detail, FIG. 4 depicts a diagram of a messaging structure 1000 in accordance with another embodiment of the invention. Except as described herein, the elements of the LTE network depicted in FIG. 4, namely UE 210, eNB 220, MME 230, SGW 240 and PGW/SMS-C 250 may function similar to the elements of the LTE network depicted in FIG. 3. Further, the set up messaging group 2000 may include similar messages as group 200 illustrated in FIG. 3 as well as modified messages. For example, the exchange of messages 2010 through 2050 may be similar to the exchange of messages 201 through 205 in FIG. 3, with the addition of certain modifications discussed herein. Thus, rather than repeat the description above, the description of the exchange of messages 201 through 205 between the UE 21, eNB 22 and MME 23 in FIG. 3 is incorporated into description of the embodiment illustrated in FIG. 4 that exchanges messages 2010 through 2050 between UE 210, eNB 220 and MME 230 with the notable inclusion of the modifications discussed herein. For example, while the messages 202, 204 and 205 in FIG. 3 include a MO, SDB indicator and SDB content the messages 2020, 2040 and 2050 in FIG. 4 may include SDB content but may, or may not, include an SDB indicator, as explained herein.

In accordance with an embodiment illustrated in FIG. 4, the MME 230 may be able to determine that the UE 210 may be substantially, always communicating with remaining elements of the LTE network using machine-to-machine communications. Accordingly, there may be no need to use the same messages as depicted in the messaging structure 100 of FIG. 3. For example, suppose the UE 210 is a traditional UE. That is, the UE 210 may be unable to transmit (or receive) a MO, SDB indicator. Realizing this, the inventors discovered an alternative way for the UE 210 to transmit SDB type data (e.g., content) despite the inability to transmit an MO, SDB indicator.

In more detail, in one embodiment of the invention messages 2020 through 2050 shown in FIG. 4 may be similar to messages 201 through 205 shown in FIG. 3 except that the messages 2020 through 2050 may be modified such that a MO, SDB indicator is not utilized. Yet further, there may be no need for the MME 230 to send an initial context set up message, such as message 206 in FIG. 3, to the eNB 220. Instead, in accordance with one embodiment of the invention, to make up for the absence of an MO, SDB indicator, the MME 230 may be operable to determine whether an estimated amount of data or data rate (e.g., content, content rate) being transmitted, or to be transmitted, from the UE 210 to the LTE network (e.g., eNB 220) in an uplink NAS message, for example, may exceed a threshold based on past transmissions from the UE 210. The threshold may be set at a level that indicates whether the UE 210 is operating substantially using machine-to-machine communications, and thus has most likely been transmitting SDB type data.

For example, in one embodiment, if the UE 210 is transmitting uplink NAS messages to the eNB 220 at or below the threshold then the MME 230 may be operable to determine that the UE 210 is, in fact, using machine-to-machine communications to communicate with the LTE network. Thus, the MME 230 may be operable to determine that the UE 210 is transmitting SDB type data even though the UE 210 may not include a MO SDB indicator in a message that is eventually received by the MME 230 because the UE 210 may be a traditional UE, for example. In one embodiment of the invention, the MME 230 may be operable to measure an actual amount of data transmitted by a UE (e.g., UE 210) over time. This allows the LTE network to use actual, measured data to apply the inventive messaging structures described herein to transmit/send/forward/receive, etc., SDB type data even though the UE 210 may not include a MO, SDB indicator within messages 2040, 2050.

Conversely, if the amount of data is above the threshold, then the MME 230 may be operable to determine that the UE 210 is not, in fact, using machine-to-machine communications to communicate with the LTE network.

In the case where the MME 230 determines that the UE 210 is using machine-to-machine communications to communicate with the LTE network, the MME 230 may be operable to transmit a UE context release command message 4030 comprising a SDB delivery indicator to the eNB 220. In such an embodiment, there is little need for an initial context set up request message (message 206 in FIG. 3), thus none is received by the eNB 220. Instead, the eNB 220 may be operable to receive the UE context release command message 4030 that has been transmitted from the MME 230. Still further, there is no need for additional CAC messages, such as the messages in group 3 shown in FIG. 1.

In yet another embodiment, the MME 230 may be operable to access a database (e.g., a part of the MME or separately associated with the MME) that includes a profile of the UE 210 (as well as other UEs) and a summary of measurements of the amount of data previously transferred within messages transmitted from the UE 210 to the eNB 220, for example, in order to assist the MME 230 in determining whether an estimated amount of data (e.g., content) within a present or future uplink, NAS message to be transmitted from at least the UE 210 to the LTE network (e.g., eNB 220) may exceed a threshold. For example, the MME 230 may compare the previously received transmissions to a threshold in order to predict that a present or future transmission from the UE 210 may, or may not exceed a threshold. In the case where the MME 230 determines that the previous transmissions within the profile do not exceed a threshold, then the MME 230 may determine that the UE 210 is using machine-to-machine communications that comprise substantially SDB type data, to communicate with the LTE network. Alternatively, the MME 230 may be operable to determine that an estimated amount of data to be transmitted from the UE 210 to the eNB 230 in a present or future uplink, NAS message may not exceed a threshold.

Accordingly, as described previously, the MME 230 may be operable to transmit a UE context release command message 4030 to the eNB 220 to release an established RRC connection and its associated resources without sending an initial context set up message to the eNB 220. After receiving the UE context release command message 4030 the eNB 220 may be operable to release the RRC connection without the need to use CAC messages, such as the messages within group 3 in FIG. 1.

Still further, as in the embodiments illustrated in FIG. 3, instead of immediately initiating a process to release an established RRC connection, the eNB 220 may be operable to start an optional timer. In this manner, if the eNB 220 (for example) determines that a downlink, ACK NAS message 2070 may be received (or, in fact, one is received) at the eNB 220 (from the MME 230 or the PGW/SMS-C 250, for example) after the timer is started, but before a configurable time period has expired (i.e., within the configurable time period), then the eNB 220 may be further operable to forward the downlink, ACK NAS message 2070 to the UE 210 as message 2071 prior to completing an RRC connection release process (e.g., prior to sending an RRC connection release message). In one or more embodiments of the invention, the configurable time period may comprise a range of time periods from 1 second to 3 seconds, for example.

In either case, that is whether an optional timer and time period are not used or once such a time period is being used and expires (or an ACK NAS message has been sent), the eNB 220 may be operable to send an RRC connection release message 4010 to the UE 210 in order to release the RRC connection, again, without using additional CAC messages.

The embodiments in FIGS. 3 and 4 may differ in other respects. For example, as depicted in FIG. 4 there may be no need for the eNB 220 to send a UE context release request message to the MME 230 because the MME has already sent a UE context release command message 4030. Instead, to complete the RRC connection release process the eNB 220 may be operable to send a UE context release complete message 4040 to the MME 230.

It should be noted that, though the description above may have included the use of a traditional UE, that the messaging structures depicted in FIG. 4 are also applicable to inventive UEs; that is, to UEs that are operable to transmit (and receive) MO, SDB indicators or similar SDB indicators.

In the embodiments illustrated in FIGS. 3 and 4 it was assumed that a UE initiated the transmission of SDB type data to elements of an LTE network (either an inventive UE or a traditional UE). In further embodiments of the invention, the other elements of the LTE network may initiate the transmission of SDB type data (e.g., content) to a UE.

Referring now to FIG. 5 there is depicted a diagram of a message structure 5000 where the transmission of SDB type data (e.g., content) may be initiated from an element of an LTE network other than a UE. The elements of the LTE network depicted in FIG. 5, namely UE 2100, eNB 2200, MME 2300, SGW 2400 and PGW/SMS-C 2500 may function similar to the elements of the LTE networks depicted in FIGS. 3 and 4, with the addition of the description described below. For ease of explanation the following discussion will focus on the transmission of messages from the eNB 2200, or reception of messages at the eNB 2200. It should be recognized, however, that related messages are received by the UE 2100 or MME 2300 or originate at UE 2100 or MME 2300, respectively.

In accordance with one embodiment of the invention, an element of the LTE network, for example MME 2300, may indicate to the UE 2100 that it is able to support SDB optimization (i.e., does not require configuration messages). For example, the eNB 2200 may be operable to receive a paging message 5015a that includes an MME based, SDB indicator from the MME 2300. Upon receiving such a paging message the eNB 2200 may be further operable to read the MME based, SDB indicator, and determine that the indicator indicates that the MME 2300 intends to send SDB type data to the UE 2100, for example.

After (e.g., in response to, upon, and the like) receiving the paging message 5015a, the eNB 2200 may be further operable to transmit or broadcast an eNB paging message 5015b that may include the SDB indicator to the UE 2100. The eNB paging message 5015b may be read by UE 2100 provided the UE 2100 is within an eNB paging area associated with the paging message 5015b, and within a tracking area of the MME 2300.

Thereafter, the eNB 2200 may be operable to wirelessly (for example) receive an RRC connection request message 5020 from the UE 2100 over an SRB channel, and, in response transmit an RRC connection set-up message 5030 to the UE 2100. Further, the eNB 2220 may be operable to allocate downlink resources and adjust message priorities in order to support the transmission of SDB type data from the LTE network to the UE 2100, without allocating TRB resources for the UE 2100. Continuing, the eNB 2200 may thereafter wirelessly receive (for example) an RRC connection set-up complete message 5040 from the UE 2100. At this point the RRC connection for signaling radio bearers has been set up with respect to the UE 2100. The eNB 2200 may now be operable to send an initial UE message 5050 to the MME 2300, receive a downlink, NAS message 5060 containing SDB type data (e.g., content) from the MME 2300 and forward the downlink, NAS message to the UE 2100 as message 5061.

In accordance with the present invention the eNB 2200 need not open a payload within the message 5060 that contains the SDB content. Instead, the eNB 2200 may be operable to forward the message 5060 and its payload on to the UE 2100 as message 5061. After receiving the message 5061, the UE 2100 may be operable to open the payload containing the SDB content and read the SDB content.

As in the embodiments illustrated in FIGS. 3 and 4, rather than exchange traditional CAC messages prior to initiating release of the established RRC connection, no such configuration messages need to be exchanged before the RRC connection release process (messages 5401 through 5403) may be begun due to the presence of the MME based, SDB type indicator in the message 5015a. The absence of the need for these messages may conserve substantial LTE network resources.

Accordingly, upon receipt of a downlink, NAS command message 5401 from the MME 2300, the eNB 2200 may be operable to send a RRC connection release message 5402 to the UE 2100, and a UE context release complete message 5403 to the MME 2300.

Still further, as with the embodiments illustrated in FIGS. 3 and 4, an ACK message may be received by the eNB 2200 from the UE 2100 before the message exchange between the UE 2100 and MME 2300 is completed. In the embodiments of FIGS. 3 and 4 a downlink, ACK signal may have been received before completion of a two-way round trip message exchange that contains a down-link, SDB message (i.e. message 2701 in FIGS. 3 and 4). Conversely, in the embodiment illustrated by FIG. 5, an uplink, ACK signal 5080 may be received before the completion of a two-way, round-trip message exchange between the UE 2100 and MME 2300. Accordingly, instead of immediately initiating a process to release an established RRC connection, the eNB 2200 may be operable to start an optional timer. In this manner, if the eNB 2200 (for example) determines that the uplink ACK, NAS message 5080 may be received (or, in fact, one is received) at the eNB 2200 (from the UE 2100, for example) after the timer is started, but before a configurable time period has expired (i.e., within the configurable time period), then the eNB 2200 may be further operable to forward the uplink, ACK NAS message 5080 to the MME 2300 as message 5081 prior to completing an RRC connection release process (e.g., prior to sending an RRC connection release message to the UE 2100). In one or more embodiments of the invention the configurable time period may comprise a range of time periods from 1 second to 3 seconds, for example.

As just described, elements of the LTE network in FIG. 5 may transmit SDB type data to the UE 2100 after first indicating to the UE 2100 and eNB 2200 that it intends to transmit such data by including an MME based, SDB type indicator in a paging message 5015*a* that is sent from the MME 2300 to the eNB 2200.

In one or more embodiments, SDB type data may be transmitted from elements within the LTE network to the UE 2100 without including an MME based, SDB type indicator within the paging message 5015*a*. In accordance with one embodiment illustrated in FIG. 5, the MME 2300 may be able to determine that an amount of pending data intended to be sent to the UE 2100 may be below a set threshold (i.e., level) typically associated with the transmission of SDB type data to the UE 2100 or other UEs, thus indicating that the pending data may be sent as SDB type data. In one embodiment, after sending the pending data the MME 2300 may be operable to instruct the eNB 2200 to close an established RRC connection in order to optimize the operation of the eNB 2200, for example, by sending the eNB 2200 a UE context release command message as described further herein. The other UEs may be inventive UEs that are capable of sending an SDB indicator and receiving SDB type data, for example, while UE 2100 may be a traditional UE (or vice-versa).

In more detail, the MME 2300 may be operable to access a database that includes profiles of inventive UEs capable of receiving SDB type data in order to set the threshold, and then determine whether the amount of pending data is below the threshold. In one embodiment the threshold may be associated with the amount(s) of data typically sent to the profiled, inventive UEs. Thus, if the MME determines that that the amount of pending data is below the threshold, the pending data is most likely SDB type data, and the MME may be operable to send the pending data as SDB type data to the eNB 2200 which, in turn, may be operable to send such data to the particular UE 2100 without using an SDB indicator. Said another way, if the MME 2300 determines that the amount of pending data intended to be sent to a traditional UE is below a set threshold associated with an amount(s) of data typically sent to inventive UEs then the MME 2300 may be operable to send SDB type data to the traditional UE, such as UE 2100 without using an MME based, SDB indicator. It should be noted that UE 2100 may be a traditional UE or an inventive UE. Yet further, once MME 2300 determines that SDB data may be sent, the MME may be further operable to prepare to send a UE context release command message to the eNB 2200 to optimize its operation, without first sending an initial context set up request message to the eNB 2200, for example.

In the case where the MME 2300 makes a determination to send the pending data as SDB type data to the UE 2100, the MME 2300, eNB 2200 and UE 2100 may be operable to exchange messages similar to messages 5020 through 5403 described above, with the exception that no SDB indicator is used, and the MME 2300 is operable to send a UE context release command message 5401 to the eNB 2200 without first sending an initial context set up request message to the eNB 2200. In accordance with one embodiment, after receiving the UE context release command message 5401 from the MME 2300, the eNB 220 may be operable to initiate the release of an established RRC connection without the need to use configuration messages such as those within group 3 in FIG. 1.

Conversely, if the amount of pending data is above the threshold then the MME 2300 may not send the pending data as SDB type data. Instead, the transmission of the pending data may use TRB with a traditional messaging structure; thus, the transmission of the pending data may not commence until configuration messages, such as those in group 3 in FIG. 1 are completed, including CAC messages, for example.

In one embodiment, the MME 2300 may be operable to measure the amount of data transmitted to UE (e.g., UE 2100) over time. This allows the LTE network to use actual, measured data to apply the inventive messaging structures described herein even though the paging message 5015*a* may not include a SDB type indicator.

Though the description above has set forth some examples of methods and systems of the present invention, variations may also fall within the scope of the invention. For example, those features, functions or processes described as being wirelessly transmitted or received may be received or transmitted via wired elements of a network. That said, the scope of the present invention is best determined by the claims that follow.

We claim:

1. A method for supporting short data burst (SDB) services, the method comprising:
    receiving a radio resource control (RRC) connection request message comprising a mobile originated (MO), SDB indicator, at an evolved node (eNB) from user equipment (UE) over a signaling radio bearer channel;
    transmitting an RRC connection set-up message from the eNB to the UE in response to the RRC connection request message;
    receiving an RRC connection set-up complete message comprising an uplink, non-access stratum (NAS) message that further comprises MO SDB content and the MO SDB indicator at the eNB from the UE;
    forwarding the NAS message with the MO SDB content and indicator and an initial UE message from the eNB to a mobility management entity (MME);
    receiving an initial context set-up request message containing an MO SDB indicator flag at the eNB from the MME;
    sending a RRC connection release message from the eNB to the UE; and
    sending a UE context release request message comprising an SDB delivery indicator from the eNB to the MME.

2. The method as in claim 1 further comprising;
    receiving a UE context release command message at the eNB from the MME; and
    sending a UE context release complete message from the eNB to the MME.

3. The method as in claim 1 further comprising transmitting a message that comprises a capability indicator from the eNB, the capability indicator indicating the eNB is capable of SDB capacity optimization.

4. The method as in claim 1 further comprising:
    transmitting the RRC connection request message from the UE to the eNB using the signaling radio bearer channel;
    receiving the RRC connection set-up message at the UE from the eNB; and
    transmitting the RRC connection set-up complete message comprising the uplink, NAS message that further comprises the MO SDB content and the MO SDB indicator from the UE to the eNB.

5. The method as in claim 1 further comprising transmitting a RRC connection request message from the UE to the eNB that does not include the MO SDB indicator based on a determination that an amount of data to be transmitted by the UE to the eNB in an uplink, NAS message exceeds a threshold; and
completing call admission control messages to set up an RRC connection.

6. The method as in claim 1 further comprising:
receiving a downlink, acknowledgment NAS message at the eNB; and
forwarding the downlink, acknowledgement NAS message from the eNB to the UE prior to sending the RRC connection release message to the UE based on a determination that the downlink, acknowledgement NAS message is received from the MME within a configurable time period.

7. A method for managing the capacity of a long term evolution (LTE) network to support short data burst (SDB) services comprising:
receiving a radio resource control (RRC) connection request message at an evolved node (eNB) from user equipment (UE) over a signaling radio bearer channel;
transmitting an RRC connection set-up message from the eNB to the UE;
receiving an RRC connection set-up complete message comprising an uplink, non-access stratum (NAS) message that further comprises SDB content at the eNB from the UE;
forwarding the NAS message with the SDB content from the eNB to a mobility management entity (MME); and
receiving a UE context release command message containing an SDB delivery indicator from the MME at the eNB.

8. The method as in claim 7 further comprising:
sending a RRC connection release message to the UE from the eNB; and
sending a UE context release complete message from the eNB to the MME.

9. The method as in claim 7 further comprising:
receiving a downlink, acknowledgement NAS message at the eNB; and
forwarding the downlink, acknowledgement NAS message from the eNB to the UE prior to sending the RRC connection release message to the UE based on a determination that the downlink, acknowledgement NAS message is received from the MME within a configurable time period.

10. The method as in claim 7 further comprising
determining at the MME that an estimated amount of data to be transmitted from the UE to the eNB in an uplink, NAS message does not exceed a threshold; and
transmitting the UE context release command message comprising the SDB delivery indicator from the MME to the eNB.

11. The method as in claim 10 further comprising:
accessing a database that includes a profile and a summary of measurements of an amount of data previously transferred from the UE to the eNB; and
determining that the estimated amount of data to be transmitted from the UE to the eNB in the uplink, NAS message does not exceed a threshold.

12. A system for managing the capacity of a long term evolution (LTE) network to support short data burst (SDB) services comprising:
an evolved node (eNB) operable to,
receive a radio resource control (RRC) connection request message comprising a mobile originated (MO), SDB indicator from user equipment (UE) over a signaling radio bearer channel;
transmit an RRC connection set-up message to the UE;
receive an RRC connection set-up complete message comprising an uplink, non-access stratum (NAS) message that further comprises MO SDB content and the MO SDB indicator from the UE;
forward the NAS message with the MO SDB content and indicator and an initial UE message to a mobility management entity (MME);
receive an initial context set-up request message containing an MO SDB indicator flag from the MME;
send a RRC connection release message to the UE; and
send a UE context release request message comprising an SDB delivery indicator to the MME.

13. The system as in claim 12, wherein the system further comprises an MME operable to send the initial context set-up request message containing the MO SB indicator flag to the eNB.

14. The system as in claim 12, wherein the eNB is further operable to:
receive a UE context release command message from the MME; and
send a UE context release complete message to the MME.

15. The system as in claim 12, wherein the eNB is further operable to transmit a message comprising a capability indicator, the capability indicator indicating the eNB is capable of SDB capacity optimization.

16. The system as in claim 12 further comprising a UE operable to receive a transmitted message comprising a capability indicator from the eNB, the capability indicator indicating the eNB is capable of SDB capacity optimization.

17. The system as in claim 16, wherein the UE is further operable to:
transmit the RRC connection request message to the eNB using the signaling radio bearer channel;
receive the RRC connection set-up message from the eNB; and
transmit the RRC connection set-up complete message comprising the uplink, NAS message that further comprises the MO SDB content and the MO SDB indicator to the eNB.

18. The system as in claim 12, further comprising a UE operable to transmit the RRC connection request message to the eNB that does not include the MO SDB indicator based on a determination that an amount of data to be transmitted by the UE to the eNB in an uplink, NAS message exceeds a threshold, wherein the eNB is further operable to complete call admission control messages to set up an RRC connection.

19. The system as in claim 12, wherein the eNB is further operable to:
receive a downlink, acknowledgment NAS message; and
forward the downlink, acknowledgement NAS message to the UE prior to sending the RRC connection release message to the UE based on a determination that the downlink, acknowledgement NAS message is received from the MME within a configurable time period.

20. A system for managing the capacity of a long term evolution (LTE) network to support short data burst (SDB) services comprising:
an evolved node (eNB) operable to,
receive a radio resource control (RRC) connection request message from user equipment (UE) over a signaling radio bearer channel;

transmit an RRC connection set-up message to the UE;
receive an RRC connection set-up complete message comprising an uplink, non-access stratum (NAS) message that further comprises SDB content from the UE;
forward the NAS message with the SDB content to a mobility management entity (MME); and
receive a UE context release command message containing an SDB delivery indicator from the MME.

* * * * *